US009955048B2

(12) United States Patent
Evans

(10) Patent No.: US 9,955,048 B2
(45) Date of Patent: Apr. 24, 2018

(54) IMAGE CAPTURE APPARATUS AND METHOD FOR CONSTRUCTING A THREE DIMENSIONAL MAP OF A TARGET OBJECT

(71) Applicant: ZAYBU Ltd., Wirral (GB)

(72) Inventor: Mark Evans, Wirral (GB)

(73) Assignee: ZAYBU LTD., Wirral (GB)

(*) Notice: Subject to any disclaimer, the term of this patent is extended or adjusted under 35 U.S.C. 154(b) by 238 days.

(21) Appl. No.: 14/782,066

(22) PCT Filed: Apr. 4, 2014

(86) PCT No.: PCT/GB2014/051072
§ 371 (c)(1),
(2) Date: Oct. 2, 2015

(87) PCT Pub. No.: WO2014/162155
PCT Pub. Date: Oct. 9, 2014

(65) Prior Publication Data
US 2016/0065798 A1 Mar. 3, 2016

(30) Foreign Application Priority Data

Apr. 4, 2013 (GB) .................................. 1306109.8

(51) Int. Cl.
G03B 17/56 (2006.01)
H04N 5/225 (2006.01)
(Continued)

(52) U.S. Cl.
CPC ......... H04N 5/2252 (2013.01); G03B 17/561 (2013.01); G03B 35/04 (2013.01); G03B 37/02 (2013.01); H04N 13/021 (2013.01)

(58) Field of Classification Search
CPC .. H04N 5/2252; H04N 13/021; G03B 17/561; G03B 35/04; G03B 37/02
(Continued)

(56) References Cited

U.S. PATENT DOCUMENTS 501,340 A 7/1893 Hackh
5,497,188 A 3/1996 Kaye
(Continued)

FOREIGN PATENT DOCUMENTS

CN 202512352 U 3/2012
WO 02 23265 A1 3/2002
(Continued)

Primary Examiner — Clayton E Laballe
Assistant Examiner — Dennis Hancock
(74) Attorney, Agent, or Firm — Andrew W. Chu; Craft Chu PLLC

(57) ABSTRACT

The image capture apparatus includes an outer stationary support structure and an inner rotatable frame which rotates around a vertical rotation axis relative to a target object. An image capture device, such as a camera, is provided on the rotatable frame to capture an image or other data relating to the target object. The camera is mounted on the rotatable frame such that, while it is rotated around the target object, data collected from the camera is transmitted to a computer for further processing. The data collected therefore allows a three dimensional digital map of the target object to be created. A method of capturing an image of a target object by rotating an inner frame around the target object on a vertical rotation axis, and then constructing a three dimensional map of the target object is also provided.

19 Claims, 15 Drawing Sheets

(51) Int. Cl.
*G03B 35/04* (2006.01)
*G03B 37/02* (2006.01)
*H04N 13/02* (2006.01)

(58) Field of Classification Search
USPC .......................................................... 396/2
See application file for complete search history.

(56) References Cited

U.S. PATENT DOCUMENTS

| | | |
|---|---|---|
| 5,857,119 A | 1/1999 | Borden |
| 8,320,648 B2 | 11/2012 | Mailling |
| 2004/0036841 A1* | 2/2004 | Dbjay .................... G03B 15/00 352/243 |
| 2009/0316965 A1 | 12/2009 | Mailling et al. |

FOREIGN PATENT DOCUMENTS

| | | |
|---|---|---|
| WO | 09 141783 A1 | 11/2009 |
| WO | 11 035164 A1 | 3/2011 |

\* cited by examiner

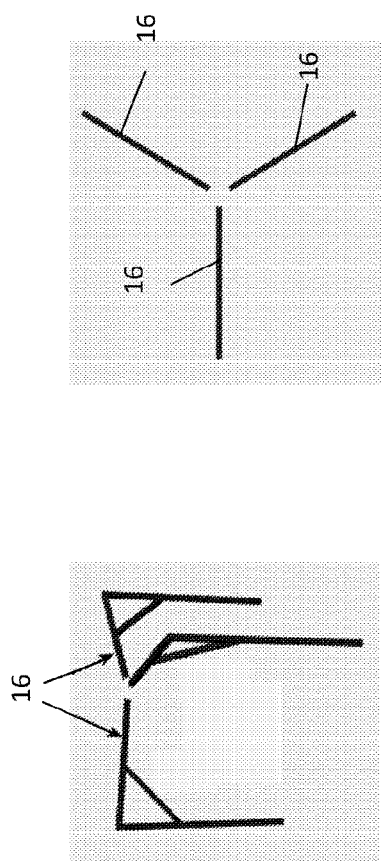
Fig. 2A
Fig. 2B
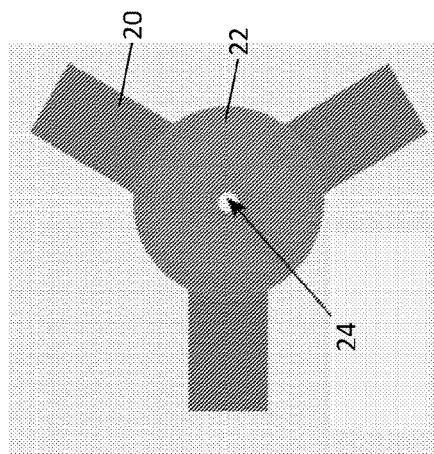
Fig. 2D
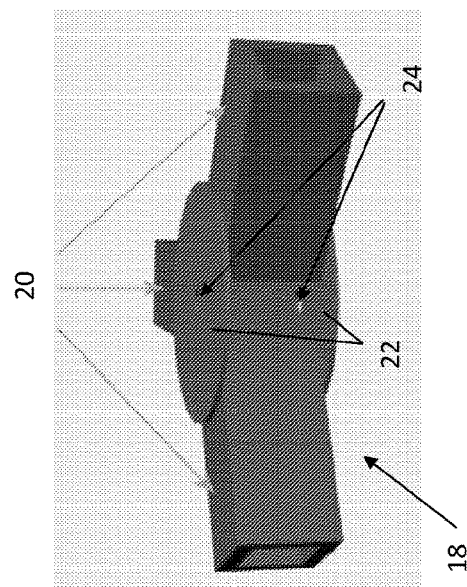
Fig. 2C

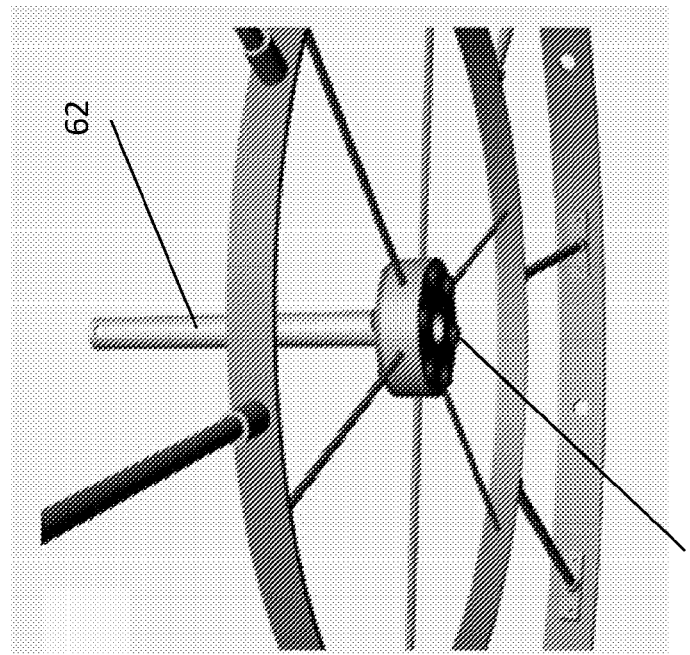
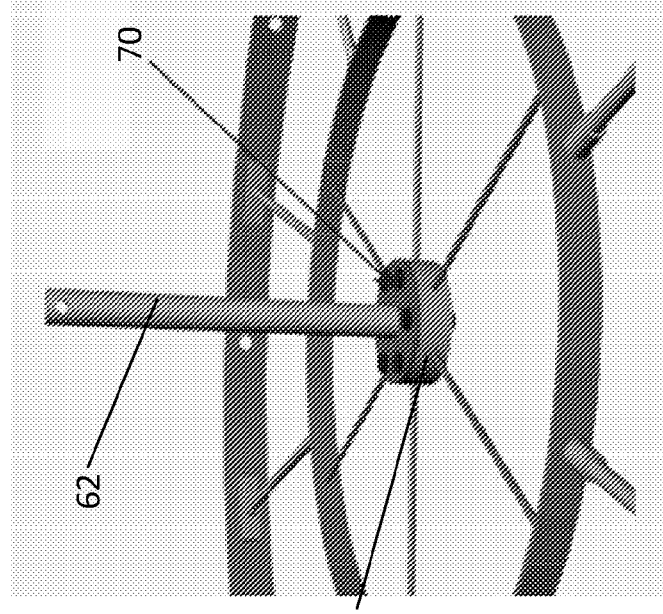
Fig. 10A
Fig. 10B

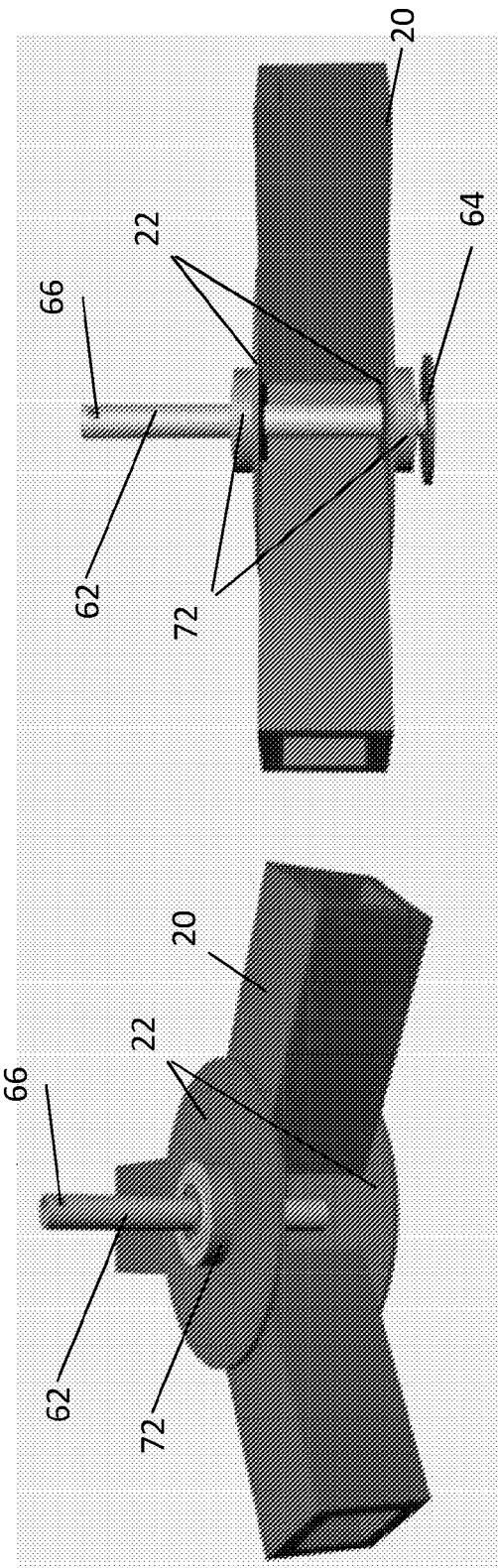

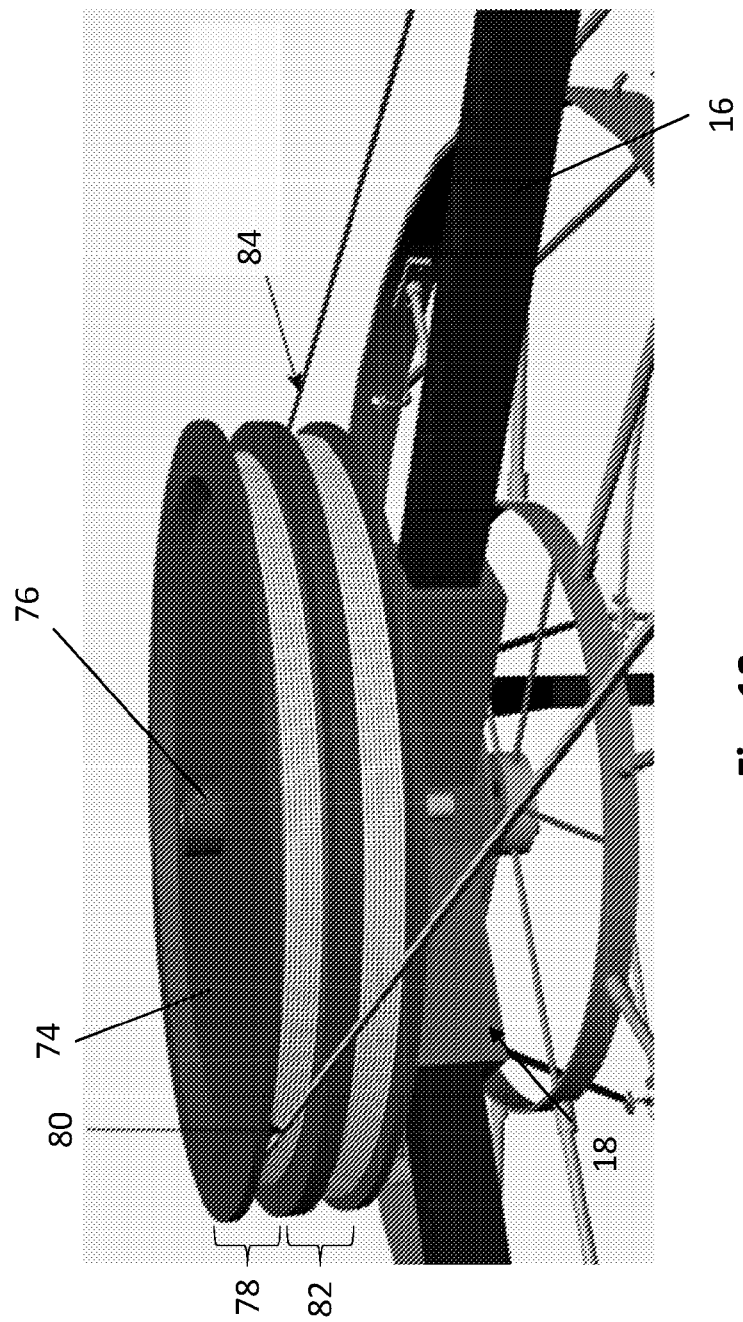

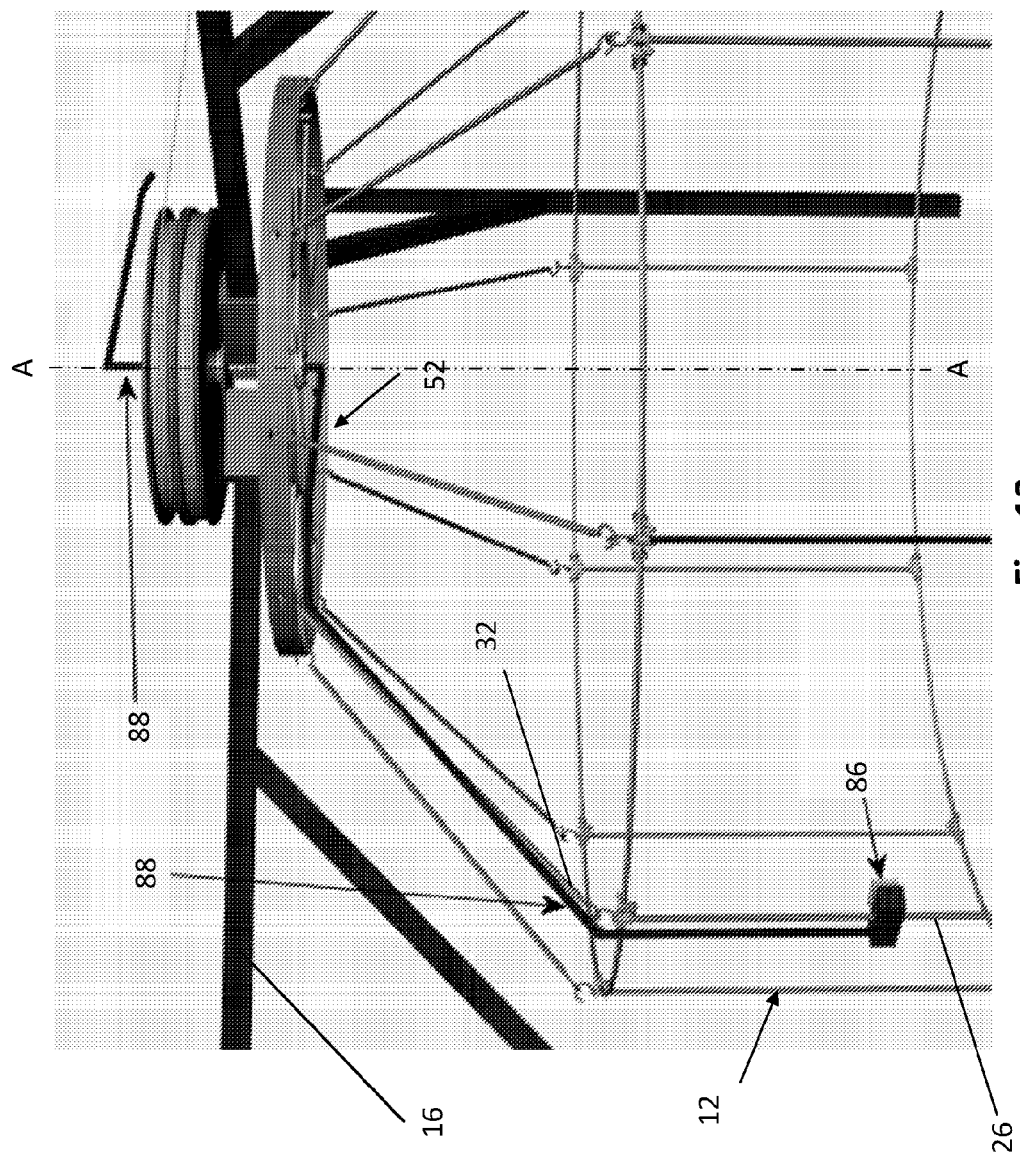

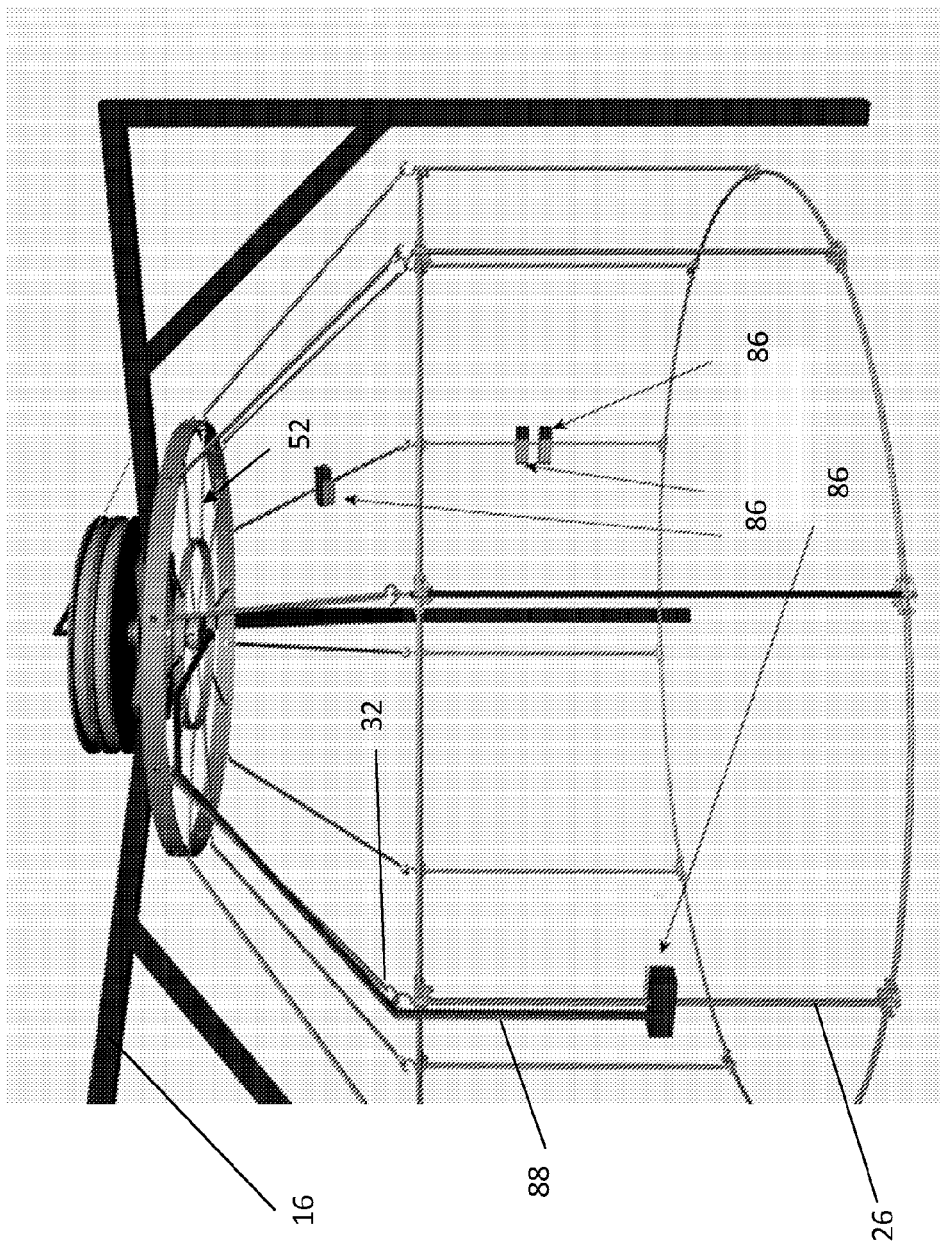

IMAGE CAPTURE APPARATUS AND METHOD FOR CONSTRUCTING A THREE DIMENSIONAL MAP OF A TARGET OBJECT

CROSS-REFERENCE TO RELATED APPLICATIONS

See Application Data sheet.

STATEMENT REGARDING FEDERALLY SPONSORED RESEARCH OR DEVELOPMENT

Not applicable.

THE NAMES OF PARTIES TO A JOINT RESEARCH AGREEMENT

Not applicable.

INCORPORATION-BY-REFERENCE ON MATERIAL SUBMITTED ON A COMPACT DISC OR AS A TEXT FILE VIA THE OFFICE ELECTRONIC FILING SYSTEM (EFS-WEB)

Not applicable.

STATEMENT REGARDING PRIOR DISCLOSURES BY THE INVENTOR OR A JOINT INVENTOR

Not applicable.

BACKGROUND OF THE INVENTION

1. Field of the Invention

The present invention relates to image capture apparatus, particularly, but not exclusively, image capture apparatus for capturing a 360 degree image of a target object such that a three dimensional model of the target object may be created.

2. Description of Related Art Including Information Disclosed Under 37 CFR 1.97 and 37 CFR 1.98.

It is possible to manually rotate a camera around a three-dimensional target object in order to capture a series of images which can then be digitally "stitched" together to create a virtual three-dimensional map of the target object. An example of when this process may be used is when creating a three dimensional wax model of a person. Since such methods rely on manually maneuvering the camera around the target object they can be very slow and labor intensive to perform. Furthermore, the results obtained typically have a number of errors and inconsistencies which are often caused by inaccurate positioning and movement of the camera around the target object.

SUMMARY OF THE INVENTION

According to a first aspect of the present invention there is provided image capture apparatus comprising an outer stationary support structure, an inner rotatable frame adapted to rotate around a substantially vertical rotation axis relative to a target object, image capture means for capturing data relating to said target object, said data being capable of constructing a three dimensional map of the target object, wherein said image capture means is mounted on said rotatable frame such that the image capture means may be selectively rotated around the substantially vertical rotation axis relative to the target object, and means for transmitting data from the image capture means to processing apparatus for further data processing.

According to a second aspect of the present invention there is provided a method of capturing an image of a target object, the method comprising providing image capture apparatus, rotating the inner rotatable frame around the target object on the substantially vertical rotation axis in order to capture data relating to said target object, and constructing a three dimensional map of the target object.

Further features and advantages of the first and second aspects of the present invention will become apparent from the claims and the following description.

BRIEF DESCRIPTION OF THE DRAWINGS

Embodiments of the present invention will now be described by way of example only, with reference to the following diagrams.

FIG. 2A is a perspective view of an illustration of support legs comprising part of an outer stationary frame of the apparatus.

FIG. 2B is a top plan view of the apparatus shown in FIG. 2A.

FIG. 2C is a perspective view of a hub member which is used to connect the support legs of FIG. 2A.

FIG. 2D is a top plan view of the hub member shown in FIG. 2C.

FIG. 10A is a perspective view of an illustration of an upper side of the spoked-wheel arrangement illustrating the engagement of the spindle pin therewith;

FIG. 10B is a perspective view of an illustration of the under-side of the spoked-wheel arrangement illustrating the engagement of the spindle pin therewith;

FIGS. 11A and 11B are perspective and elevation views of illustrations of a bearing arrangement provided on the hub member of the stationary support frame.

FIG. 12 is a perspective view of a drive wheel engaged with the spindle pin of the inner rotatable frame.

FIGS. 13 and 14 are more detailed perspective views of illustrations of the inner rotatable frame shown in FIG. 1, where image capture apparatus are illustrated along with an associated data transmission cable.

DETAILED DESCRIPTION OF THE DRAWINGS

Figure 1:
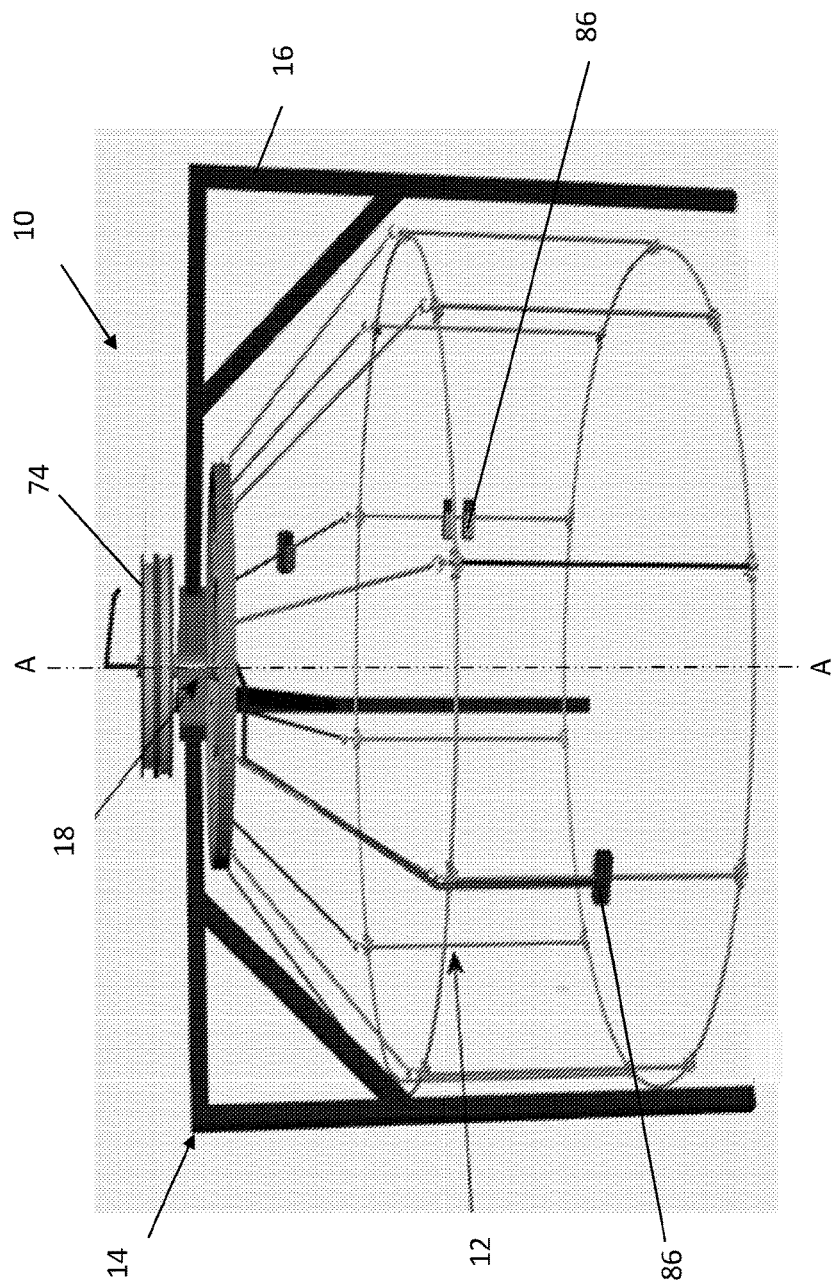
FIG. 1 is a schematic view of an illustration of the image capture apparatus according to the present invention.
Figure 2E:
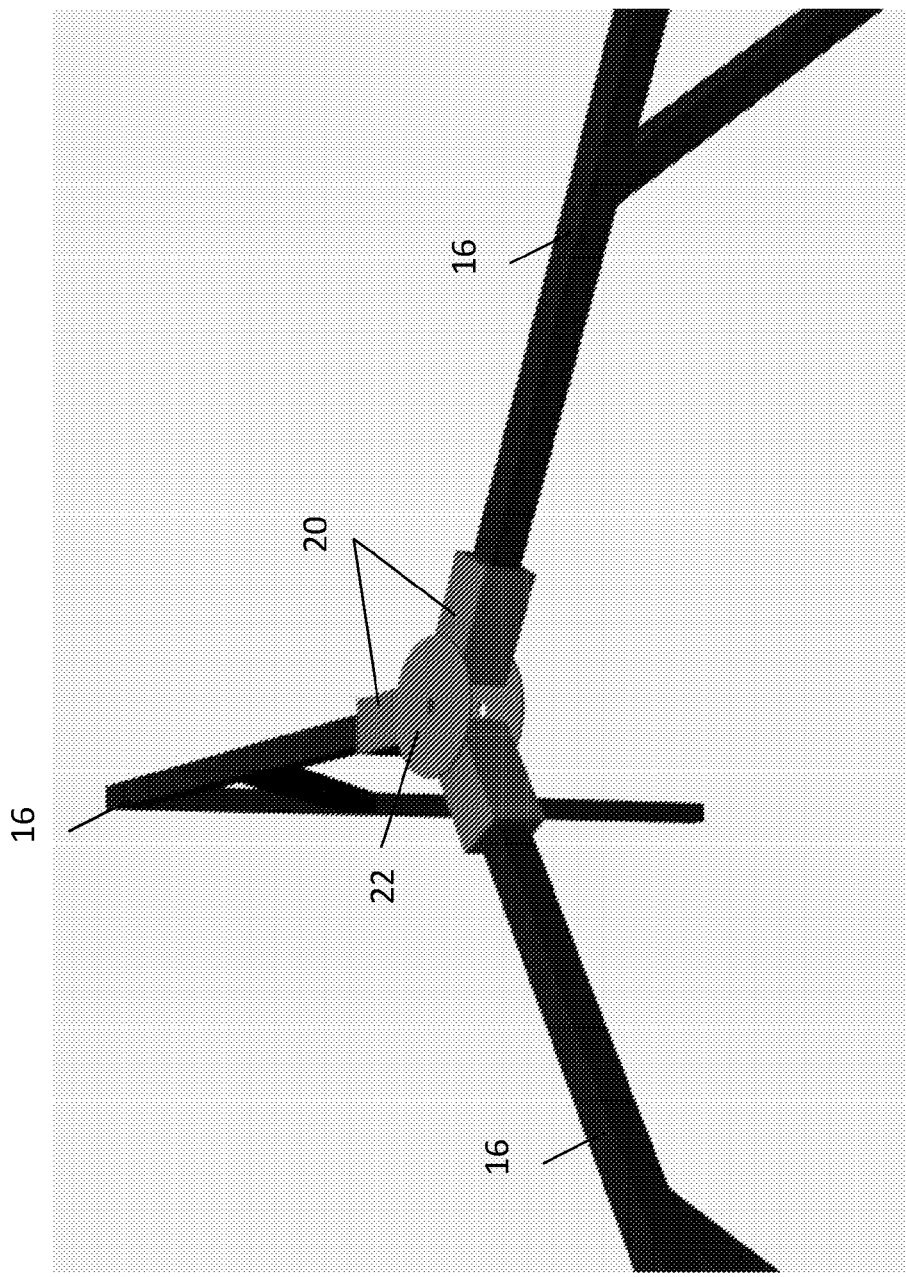
FIG. 2E is perspective view of an illustration of the support legs of FIG. 2A connected by the hub member of FIG. 2C.

With reference to FIG. 1, image capture apparatus generally designated 10, is provided with a lightweight inner rotatable frame 12 suspended from an outer stationary frame 14. As shown in FIGS. 2A to 2E, the outer stationary frame 14 comprises a series of three support legs 16 which are connected to one another by a hub member 18. The bottom of each support leg 16 is provided with an adjustable rubber foot to allow the relative heights of the support legs 16 to be adjusted in order to account for any sloping or uneven ground. With particular reference to FIG. 2C, the hub member 18 has three female sockets 20 and a pair of upper and lower central spindle discs 22 each having spindle pin apertures 24 provided therethrough. As shown in FIG. 2E, each female socket 20 receives a support leg 16 therein in order to form a stable tri-pod arrangement of the outer stationary frame 14.

Figure 3:
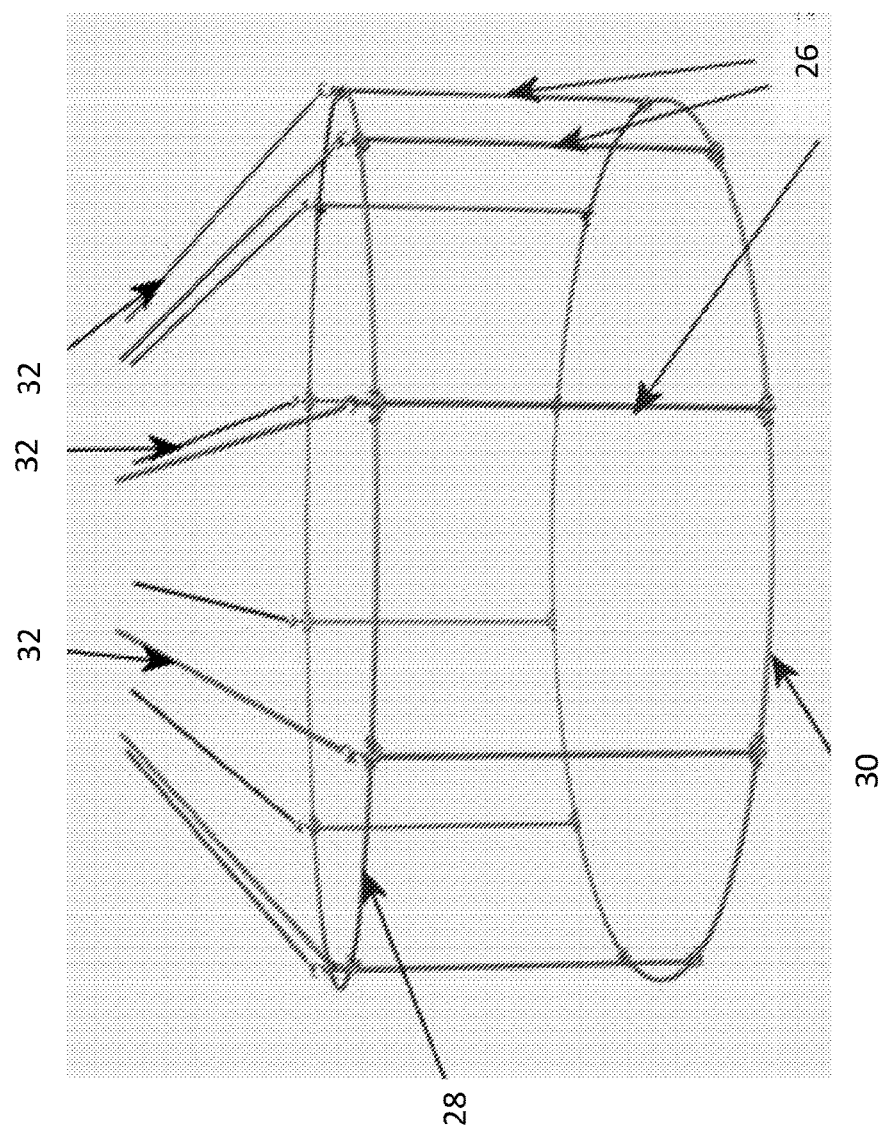
FIG. 3 is a perspective view of an illustration of the partly assembled inner rotatable frame of the FIG. 1 apparatus.
Figure 4B:
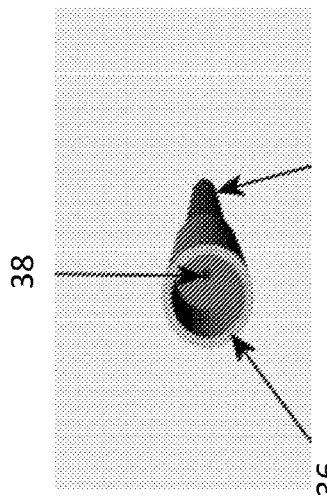
FIG. 4B is an end view of the glass fiber rod shown in FIG. 4A illustrating an end attachment collar in greater detail.
Figure 4A:
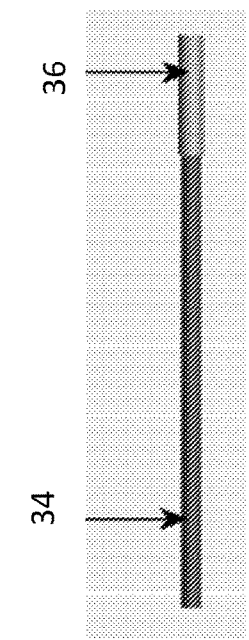
FIG. 4A is a transverse elevation view of an example glass fiber rod used in the construction of the inner rotatable frame.

With reference to FIG. 3 a base portion of the inner rotatable frame 12 comprises a series of vertical support rods 26 which connect an upper hoop 28 and a lower hoop 30. Angled struts 32 are also attached above the upper hoop 28. As shown in FIG. 4A, in the present embodiment, the upper and lower hoop members (and optionally other members of the inner rotatable frame 12) comprise a series of bendable glass fiber rods 34 having an attachment collar 36 mounted on one end thereof. This allows the glass fiber rods 34 to be easily and rapidly connected together to form the inner rotatable frame 12. As shown in FIG. 4B, quick and straightforward assembly of the frame 12 can be further facilitated by providing a small hole 38 through the centre of each rod 34 and an elasticized string (not shown) which is threaded through the centre thereof. This also makes re-assembly of the frame 12 easier should joints come apart accidentally and serves as a safety-feature since it stops the members "catapulting" in the event of the joints springing apart.

When constructing the inner rotatable frame 12 several glass fiber rods 34 are connected to form the upper and lower hoops 28, 30 (the ends of the resulting hoop can be connected together by providing a female-female rod as the last rod on the assembly).

Figure 4D:
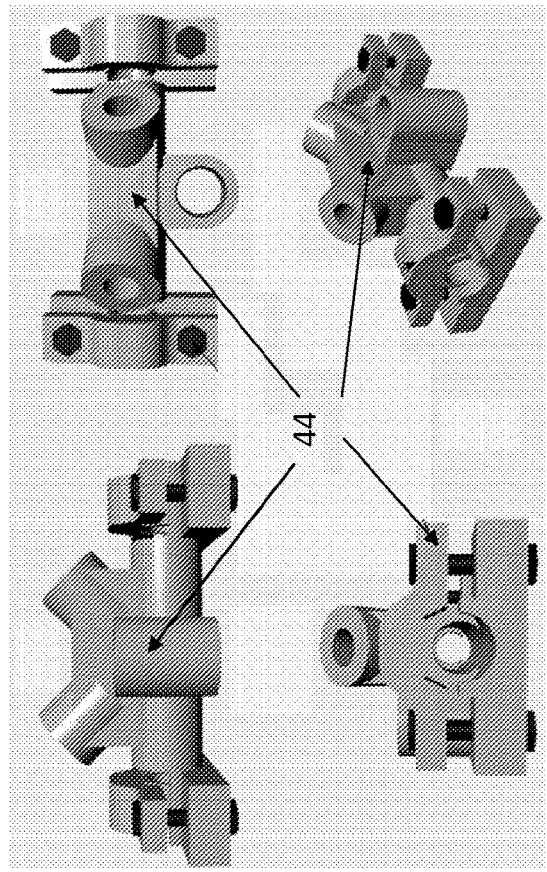
FIG. 4D shows front, plan, end and perspective views of illustrations of a clamping member used in the construction of the inner rotatable frame.
Figure 4C:
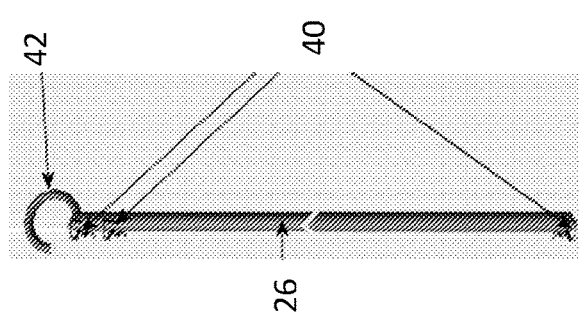
FIG. 4C is a transverse elevation view of an example vertical support rod used in the construction of the inner rotatable frame.

With reference to FIG. 4C, in the present embodiment, the vertical support rods 26 may be thicker and less flexible than the glass fiber rods 34 of the hoops 28, 30. Each rod 26 is also provided with connecting clips 40 and an attachment hook 42.

Figure 5A:
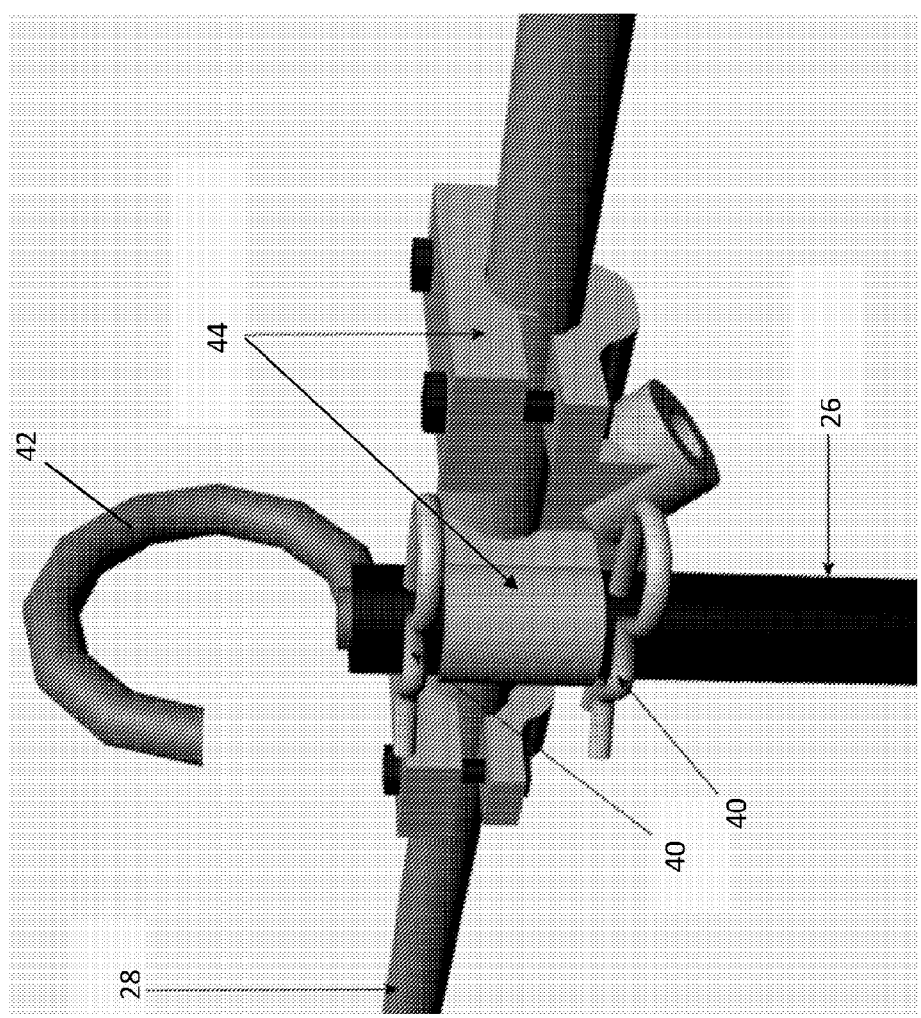
FIG. 5A is a perspective view of a join at an upper end of the vertical support rod and an upper hoop member of the inner rotatable frame where the join is facilitated by the clamping member of FIG. 4D.

As shown in FIG. 4D a three-way plastic attachment and clamping member 44 is provided. As can be seen in FIG. 5A, this is used to connect the top hoop members 28 to the upper end of each vertical rod 26. At the upper end, each vertical rod 26 has a pair of small holes which each receive a connecting clip 40 therein in order to secure the rod in place.

Figure 5B:
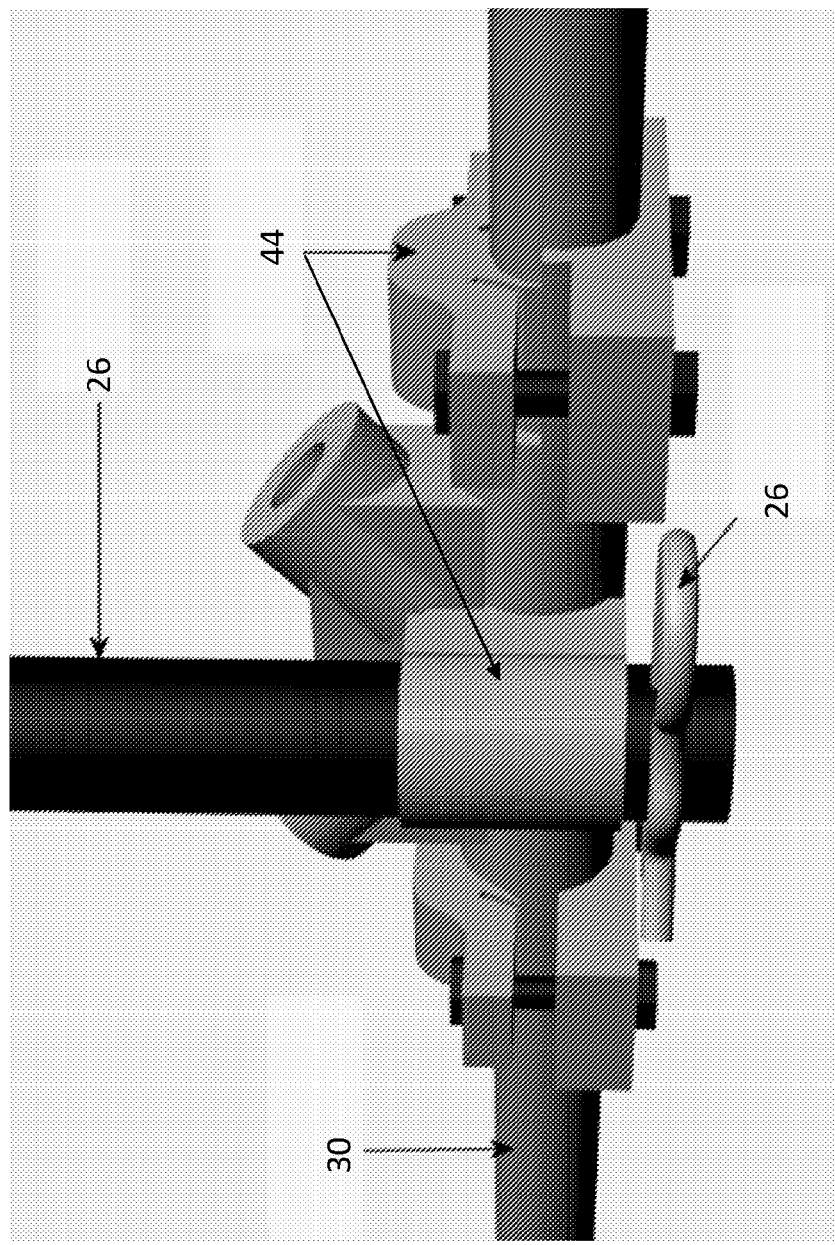
FIG. 5B is a perspective view of a join at a lower end of the vertical support rod and a lower hoop member of the inner rotatable frame where the join is facilitated by the clamping member of FIG. 5B.

As shown in FIG. 5B, separate clamping members 44 are also used to connect the lower hoop member 30 with the lower end of each vertical rod 26. Additional female sockets are also illustrated in the clamping members of FIGS. 4D, 5A and 5B which are at approximately 45 degrees to the vertical rod 26; these additional sockets are able to receive additional glass fiber rods (not shown) which can cross diagonally from the upper hoop 28 to the lower hoop 30. This allows additional structural rigidity to be provided to the inner rotatable frame 12 if required.

Figure 6:
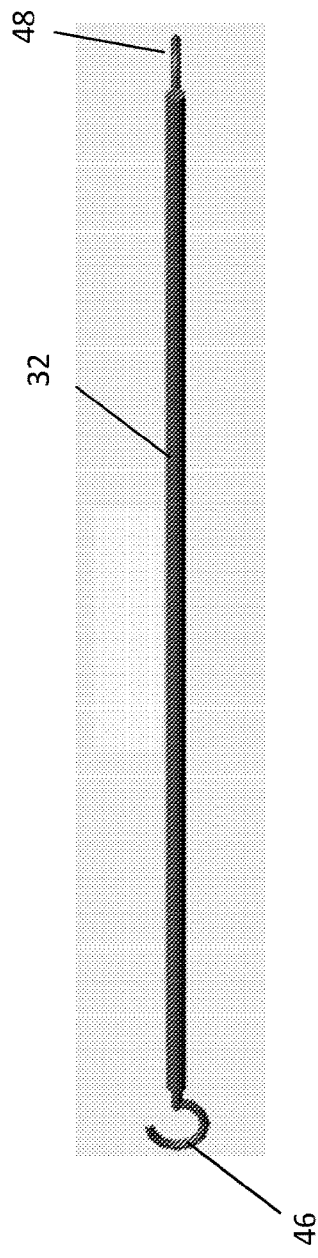
FIG. 6 is a transverse elevation view of an example angled strut used in the construction of the inner rotatable frame.
Figure 7:
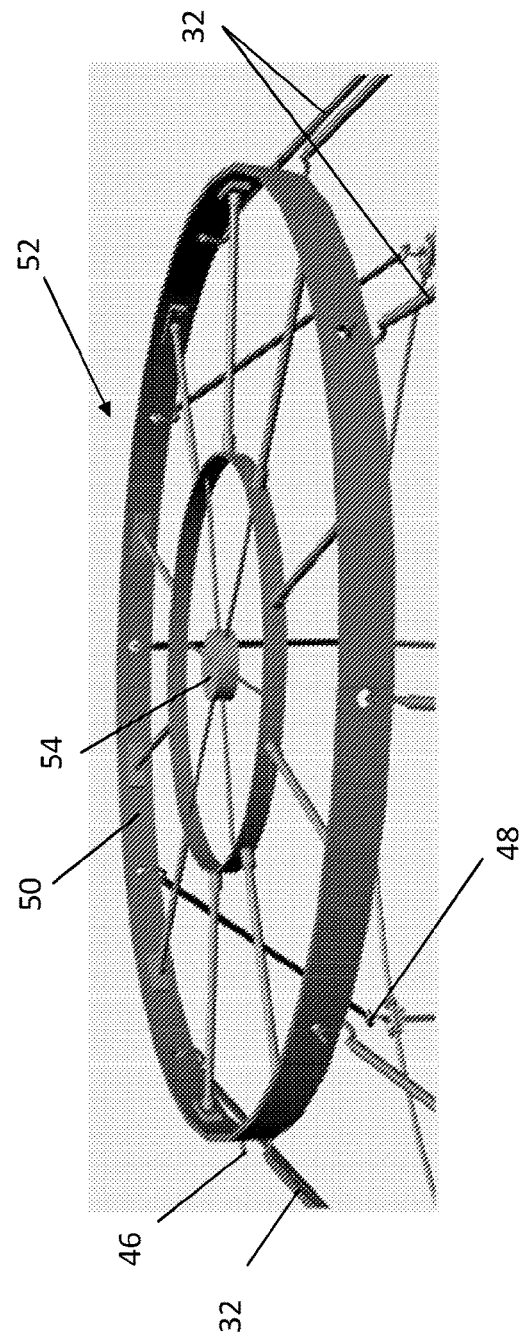
FIG. 7 is a perspective view of a spoked-wheel arrangement used in the construction of the inner rotatable frame.

With reference to FIG. 6, each angled strut 32 is provided with a first hook 46 at its upper end and a corresponding second hook 48 at its lower end. The first and second hooks are set at right angles to one another. As shown in FIG. 7, this allows the upper hooks 46 of each angled strut 32 to hook into a corresponding hole in an outer rim 50 of a spoked-wheel arrangement 52. The lower hooks 48 of each angled strut 32 each hook onto the hook 42 of each vertical strut 26.

Figure 8:
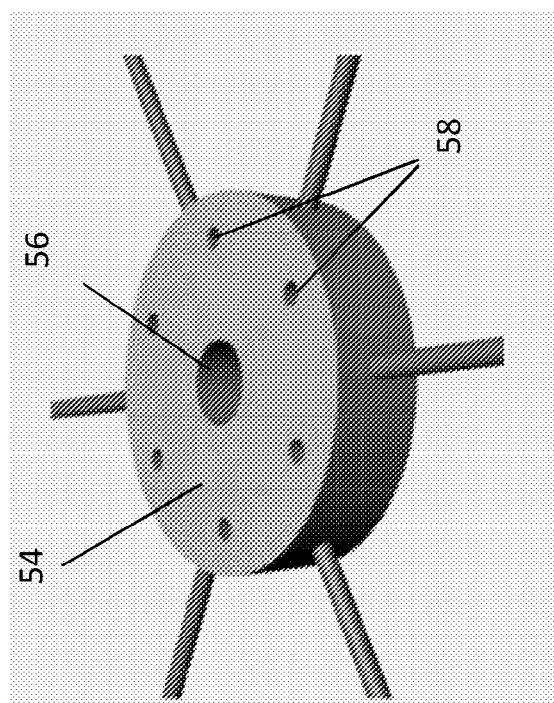
FIG. 8 is a more detailed perspective view of a hub arrangement of the spoked-wheel shown in FIG. 7.

The spoked-wheel 52 is provided with a hub 54 at its centre. As shown in FIG. 8 a spindle aperture 56 is provided through the centre of the hub 54 and a series of attachment holes 58 are provided around the edge of the hub 54.

Figure 9B:
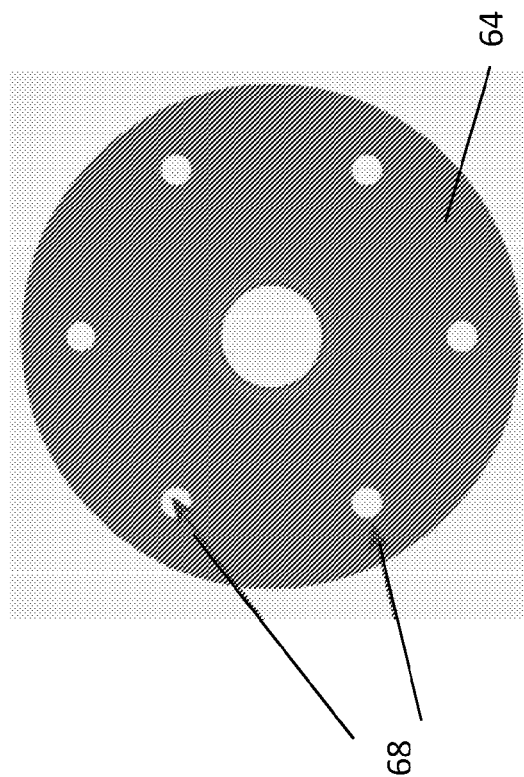
FIG. 9B is a top plan view of a spindle flange of the spindle arrangement of FIG. 9A.
Figure 9A:
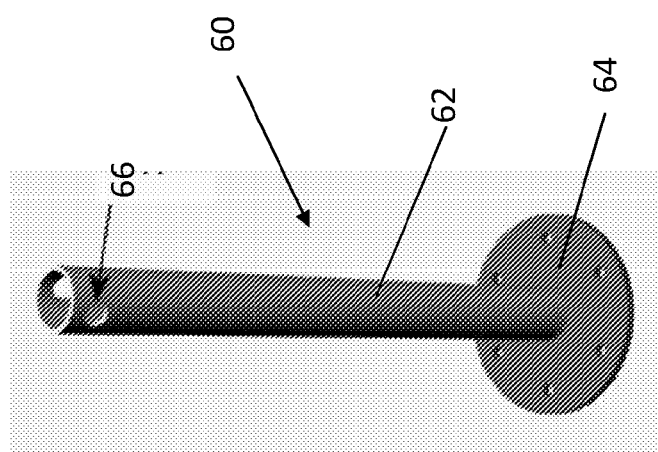
FIG. 9A is a perspective view of an illustration of a spindle arrangement used to secure the spoked-wheel arrangement of the inner rotatable frame to the outer stationary frame.

With reference to FIGS. 9A and 9B, a spindle arrangement 60 comprises a spindle pin 62 and a spindle flange 64 connected to the bottom end thereof. The spindle pin 62 has a hollow throughbore therealong and is provided with a locking hole 66 toward its upper end. The spindle flange 64 has a series of attachment holes 68 around its edge. As shown in FIGS. 10A and 10B, the spindle pin 62 is inserted through the spindle aperture 56 of the hub 54 and the flange 64 is attached to the hub 54 by a series of attachment bolts 70.

As shown in FIGS. 11A and 11B with the inner rotatable frame 12 constructed as previously described, it can then be attached to the outer stationary stand 14 by lifting the inner rotatable frame 12 and inserting the spindle pin 62 through the spindle aperture 24 of the hub 18 on the outer stationary frame 14. In order to ensure that the inner rotatable frame 12 can freely rotate on the outer stationary frame 14 a pair of bearings 72 are provided between the spindle pin 62 and the plates 22 of the hub 18. In the present embodiment, the bearings 72 comprise ball-bearing arrangements; however alternative arrangements could be used. The spindle pin 62 is accurately sized so as to provide an interference fit with the internal diameters of the bearings 72. This allows the bearings 72 to facilitate rotation of the inner rotatable frame 12 as opposed to the spindle pin 62 spinning freely within the bearings 72. In this way, the inner rotatable frame 12 is able to rotate around a rotation axis A-A which passes substantially vertically through the centre of the arrangement 10.

As best illustrated in FIG. 12, a drive wheel 74 is secured to the top of the spindle pin 62 by way of a locking pin 76 inserted into the locking hole 66; this also secures the weight of the suspended inner rotatable frame 12. The drive wheel 74 is provided with an upper profiled section 78 which receives an upper drive cable 80 wrapped there around and a lower profiled section 82 which receives a lower drive cable 84 wrapped there around. The pair of drive cables 80 and 84 are wrapped around the drive wheel 74 in opposite directions such that they can be used to drive the drive wheel 74 in either direction. Furthermore, driving the drive wheel 74 in one direction with one drive cable will cause the other drive cable to be wound back onto the drive wheel 74 such that that cable is then ready to drive the drive wheel 74 in the opposite direction.

With reference to FIG. 13, image capture means in the form of a camera 86 is attached to a vertical support rod 26 of the inner rotatable frame 12. A transmission cable 88 is connected to the camera 86 and is routed up the adjacent vertical support rod 26, along the adjacent angled strut 32, across the spoked-wheel arrangement 52, through the hollow throughbore of the spindle pin 62 and out the top thereof. The top end of the transmission cable 88 then leads to a computer or other controller for data processing. Attachment clips are provided to secure the transmission cable 88 to the vertical rod 26, angled strut 32 and spoked-wheel 52. This provides a direct route for the transmission cable 88 to pass from the camera 86 to the computer or other controller without encroaching upon the inner frame rotation envelope (the area that is contained by the inner rotatable frame 12). Passage of the cable 88 through the hollow spindle pin 62 also ensures that the cable is able to twist as the inner rotatable frame 12 rotates through 360 degrees without tangling or interfering with rotation of the frame 12.

As shown in FIG. 14, several data capture devices 86 can be provided at different locations around the inner rotatable frame 12 if required. Furthermore, the image capture device 86 may also include additional data capture devices such as one or more infrared, ultraviolet, and/or three dimensional depth of field capture devices.

The described invention allows the user to quickly construct the inner and outer frames 12, 14 without any specialist skills, tools or equipment. Furthermore, the skilled reader will appreciate that each of the components can be easily and quickly dismantled and compactly stored such that the apparatus of the present invention can be readily moved from one location to another.

In use, and with reference to FIG. 1, once the inner rotatable frame 12 has been constructed and suspended on the outer stationary frame 14 a target object (not shown) is placed towards the centre of the inner rotatable frame 12. The target object may be a still model of an inanimate object or may alternatively be a live human or animal subject. Once positioned, the image capture apparatus is then placed on standby ready to capture the 360 degree image. Either of the upper or lower drive cables, 80, 84 can then be pulled by a manual or automatic powered pulley arrangement (not shown) in order to rotate the inner frame 12 around the vertical rotation axis A-A by way of the drive wheel 74.

As the inner frame 12 rotates around the target object, the cameras 86 (mounted on either side of the frame 12 in the presently described embodiment) capture a 360 degree image of the subject. In doing so, rotational orientation data may optionally be passed to the data processing means to correlate the rotational position of each image captured such that the data processing means can assemble a virtual three dimensional map of the subject.

Once the first drive cable has been pulled and the frame 12 rotated in one direction through 360 degrees, the opposite drive cable can then be pulled to return the frame 12 to its starting position. Optionally, as the frame 12 is returned to its starting position a second image capture step may be performed in order to provide a second set of data. This second set of data can be processed, merged or compared with the first set of data to improve the quality of the reading and minimize the likelihood of errors. Alternatively, this second image capture step could be used to capture different forms of data relating to the target object. Indeed, several consecutive rotations may be performed to collect several different sets of data if desired.

The resulting virtual three-dimensional map of the subject may be output to a three dimensional printer or other equipment in order to build a physical representation of the target object. This can be used to create a three dimensional wax model of a person for example.

The present invention therefore provides a lightweight and portable piece of apparatus for capturing three dimensional data on a target subject around 360 degrees. The three dimensional data may comprise a data-set which can be used to build up a three dimensional model or alternatively, may be a series of still or moving images that together form a set of images that depict a three dimensional image of a target subject.

Although particular embodiments of the invention have been disclosed herein in detail, this has been done by way of example and for the purposes of illustration only. The aforementioned embodiments are not intended to be limiting with respect to the scope of the appended claims.

It is contemplated by the inventor that various substitutions, alterations, and modifications may be made to the invention without departing from the spirit and scope of the invention as defined by the claims. Examples of these include the following:—

If an image of a very large target object is to be captured, thicker, heavier and or stronger members may be used to form the inner rotatable frame 12. Furthermore, additional vertical support members 12 may be provided around the circumference of the inner rotatable frame 12 to minimize any flexing or instability.

An alternative drive wheel arrangement may be provided depending upon the application required. For example, rather than the cable-based system described, the drive wheel arrangement may comprise a tooth-and-chain based system.

The lightweight inner rotatable frame 12 may comprise a single rotating arm rather than several interconnected rods. Alternatively, the inner rotatable frame could comprise a dome-shaped canopy with solid walls there around.

Rather than the attachment hooks 42, 46, 48 an alternative integrated construction may be deployed whereby articulated hinged joints are provided between the sections. In addition, one or more of the glass fiber rods of the inner rotatable frame 12 may be hinged in order to allow a person (who may become the target object to be scanned) to readily gain access to and from the interior of the inner rotatable frame 12.

In an alternative embodiment, rather than the coiled cable and spindle arrangement, an electrical slip ring arrangement may be provided which provides both an electrical and data connection between the inner rotatable frame 12 and the outer stationary frame 14 through 360 degrees of rotation.

I claim:
1. An image capture apparatus, comprising:
an outer stationary support structure;
an inner rotatable frame rotatable around a vertical rotation axis relative to a target object;
a means for capturing data relating to said target object, said data constructing a three dimensional map of said target object,
wherein said means for capturing data is mounted on said inner rotatable frame so as to be selectively rotated around said vertical rotation axis relative to said target object;

means for transmitting data from said means for capturing data to a processing apparatus for further data processing;
at least one data transfer cable connected to said means for capturing data and said processing apparatus; and
a hub arrangement corresponding to said inner rotatable frame and mounted to said outer stationary support structure and to said inner rotatable frame so as to facilitate rotation of said inner rotatable frame relative to said outer stationary support structure,
wherein said hub arrangement is comprised of a hollow spindle, said at least one data transfer cable being received within said hollow spindle.

2. The image capture apparatus, according to claim 1, wherein said at least one data transfer cable comprises:
a communication cable connected to said means for capturing data; and
a corresponding communication cable connected to said processing apparatus,
wherein said hub arrangement further comprises: an electrical bridging connection in communication with said communication cable and said corresponding communication cable so as to transmit said data from said communication cable to said corresponding communication cable.

3. The image capture apparatus, according to claim 2, wherein said electrical bridging connection comprises a slip ring arrangement.

4. The image capture apparatus, according claim 1, wherein said at least one data transfer cable is coiled and uncoiled corresponding to rotation of said inner rotatable frame relative to said outer stationary support structure.

5. The image capture apparatus, according to claim 1, wherein said at least one data transfer cable is secured to a portion of said inner rotatable frame so as to avoid obstruction of rotation of said inner rotatable frame.

6. The image capture apparatus, according to claim 1, further comprising:
a bearing arrangement on said hub arrangement so as to reduce friction, facilitating rotation of said inner rotatable frame relative to said outer stationary support structure.

7. The image capture apparatus, according to claim 1, further comprising:
means for driving rotation of said inner rotatable frame on said vertical rotation axis relative to said outer stationary support structure.

8. The image capture apparatus, according to claim 7, wherein said means for driving comprises a drive wheel connected to said hollow spindle, and a drive cable,
wherein said drive cable is mounted on said drive wheel so as to selectively rotate said drive wheel, said inner rotatable frame rotating on said vertical rotation axis corresponding to rotation of said drive wheel.

9. The image capture apparatus, according to claim 1, wherein said inner rotatable frame further comprises a plurality of interconnected frame members connected so as to form a latticework frame.

10. The image capture apparatus, according to claim 9, further comprising:
a spoked-wheel arrangement in engagement with said plurality of interconnected frame members.

11. The image capture apparatus, according to claim 10, wherein said latticework frame is further comprised of an upper hoop member, a lower hoop member, a plurality of vertical rod members connecting said upper hoop member, said lower hoop member, and a plurality of angled strut members connecting said vertical rod members to said spoked-wheel arrangement.

12. The image capture apparatus, according to claim 11, wherein each vertical rod member has an upper end with a hook, and
wherein each angled strut member has a lower end with with a corresponding hook, said hook and said corresponding hook being connected to one another.

13. The image capture apparatus, according to claim 1, wherein the outer support structure comprises a plurality of support struts connected by a bearing arrangement so as to receive said hollow spindle.

14. A method of capturing an image of a target object, the method comprising the steps of:
providing an image capture apparatus according to claim 1;
rotating said inner rotatable frame around said target object on said vertical rotation axis in order to capture data relating to said target object; and
constructing a three dimensional map of said target object.

15. The method according to claim 14, further comprising the step of:
forming a physical three dimensional model of said target object from said three dimensional map.

16. The method according to claim 14, further comprising the step of:
rotating said inner rotatable frame around said target object more than once and in more than one direction in order to obtain additional data sets relating to said target object.

17. An image capture apparatus, comprising:
an outer stationary support structure;
an inner rotatable frame rotatable around a vertical rotation axis relative to a target object;
a means for capturing data relating to said target object, said data constructing a three dimensional map of said target object,
wherein said means for capturing data is mounted on said inner rotatable frame so as to be selectively rotated around said vertical rotation axis relative to said target object;
means for transmitting data from said means for capturing data to a processing apparatus for further data processing;
means for driving rotation of said inner rotatable frame on said vertical rotation axis relative to said outer stationary support structure,
wherein said means for driving comprises a drive wheel connected to a hollow spindle, and a drive cable,
wherein said drive cable is mounted on said drive wheel so as to selectively rotate said drive wheel, said inner rotatable frame rotating on said vertical rotation axis corresponding to rotation of said drive wheel,
wherein the drive wheel is provided with a double profile,
wherein said means for driving further comprises another drive cable, and
wherein said drive cable is windable around said drive wheel in a first direction and said another drive cable is windable around said drive wheel in an opposite direction so as to selectively rotate said inner rotatable frame clockwise and anti-clockwise on said outer stationary support structure.

18. The image capture apparatus, comprising:
an outer stationary support structure;
an inner rotatable frame rotatable around a vertical rotation axis relative to a target object;

a means for capturing data relating to said target object, said data constructing a three dimensional map of said target object, wherein said means for capturing data is mounted on said inner rotatable frame so as to be selectively rotated around said vertical rotation axis relative to said target object;

means for transmitting data from said means for capturing data to a processing apparatus for further data processing, wherein said inner rotatable frame further comprises a plurality of interconnected frame members connected so as to form a latticework frame; and elasticized connecting members between at least two interconnected frame members so as to facilitate assembly of said latticework frame.

19. The image capture apparatus, according to claim 18, further comprising:

clamping members connecting said interconnected frame members to one another.

\* \* \* \* \*